2 Sheets--Sheet 1.

N. J. SIMONDS & E. R. EMERY.
Machinery for Molding Heel-Stiffenings for
Boots and Shoes.

No. 147,288. Patented Feb. 10, 1874.

WITNESSES.
H. K. Porter
C. F. Marston

INVENTORS.
Nathan J. Simonds
E. R. Emery
By T. W. Porter Atty

2 Sheets--Sheet 2.

N. J. SIMONDS & E. R. EMERY.
Machinery for Molding Heel-Stiffenings for Boots and Shoes.

No. 147,288. Patented Feb. 10, 1874.

WITNESSES.

INVENTORS.

UNITED STATES PATENT OFFICE.

NATHAN J. SIMONDS AND E. RUSSELL EMERY, OF WOBURN, MASS.

IMPROVEMENT IN MACHINERY FOR MOLDING HEEL-STIFFENINGS FOR BOOTS AND SHOES.

Specification forming part of Letters Patent No. 147,288, dated February 10, 1874; application filed June 30, 1873.

CASE B.

*To all whom it may concern:*

Be it known that we, NATHAN J. SIMONDS and E. R. EMERY, of Woburn, in the county of Middlesex and State of Massachusetts, have invented new and useful Improvements in Machinery for Molding Heel-Stiffenings for Boots and Shoes, of which the following is a specification:

This invention relates to machines employed to mold or compress heel-stiffenings into the exact configuration which they are to occupy when embodied in the boot or shoe; and the invention consists in a solid form, corresponding to the interior of a molded stiffening, an elastic intermediate mold, and a divided mold, the cavity in which corresponds to the exterior of a molded stiffening; also in relief devices which compensate for varying thicknesses of stiffenings, said devices consisting of elastic packing placed beneath and behind the form, of yielding supports to which the halves of the mold are hinged, and also in adjustable cams which act upon the divided mold as it descends and force it against the intermediate mold and the stiffening.

Figure 1:
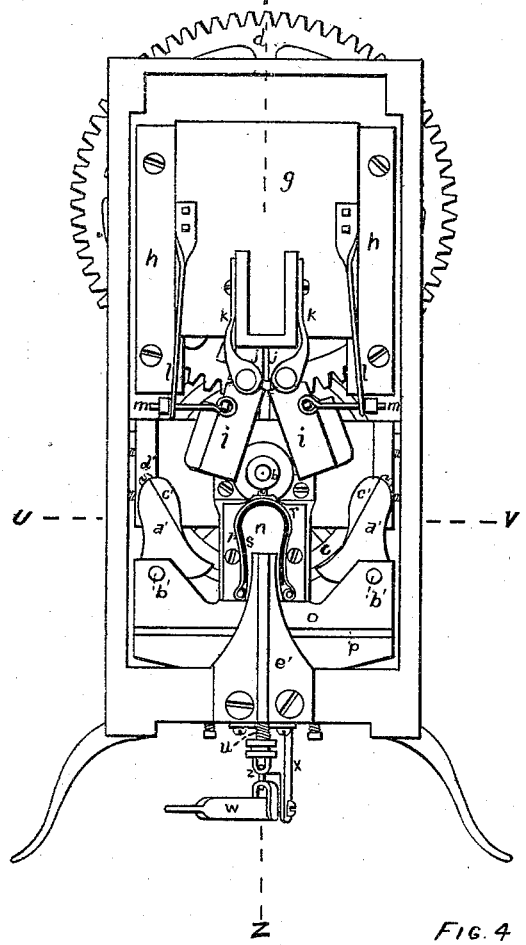
Figure 3:
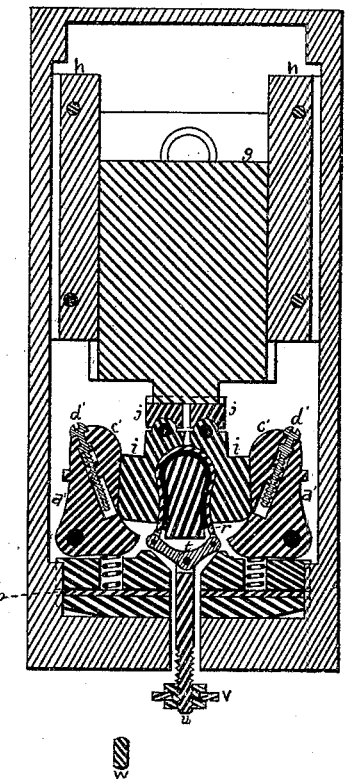
Figure 4:
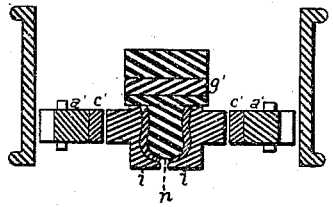
Figure 2:
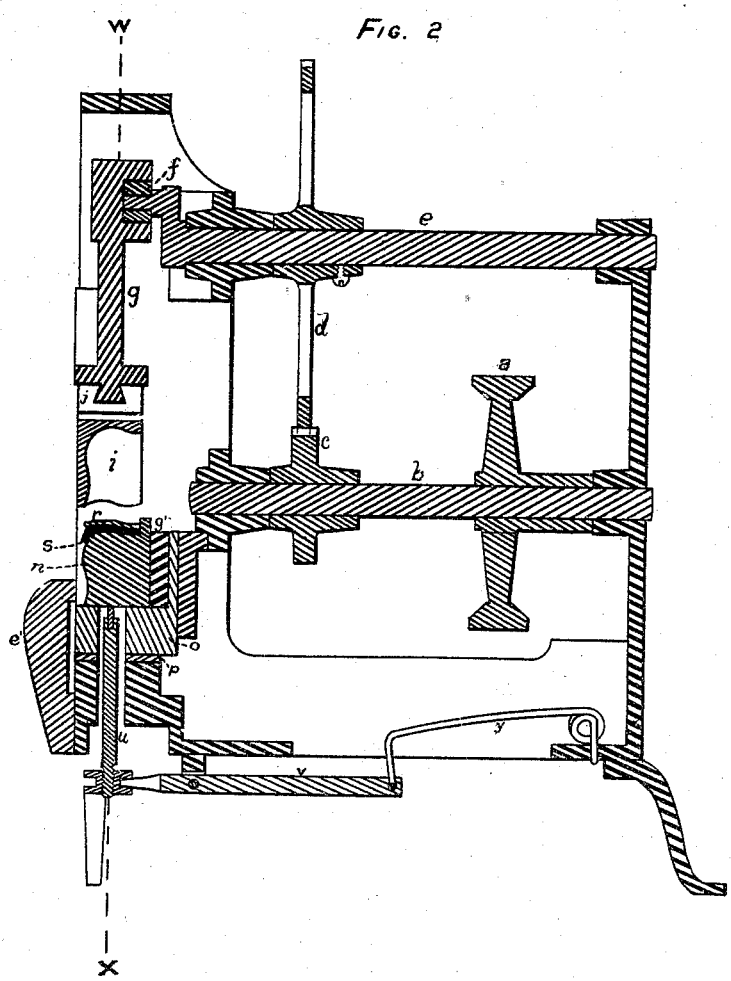

Figure 1 is a front elevation, showing the divided mold raised. Fig. 2 is a vertical section taken on line Y Z, Fig. 1. Fig. 3 is a vertical section taken on line W X, Fig. 2, and showing the molds closed upon the stiffening. Fig. 4 is a horizontal section taken on line U V, Fig. 1, and also showing the molds closed upon the stiffening.

In the drawings, $a$ represents the driving-pulley, which is actuated either by a belt, clutch, or other device. $b$ is the driving-shaft, upon which is secured pulley $a$ and pinion $c$, which latter meshes into gear-wheel $d$, secured upon shaft $e$, the front end of which is formed with a crank, as shown in Fig. 2, the wrist-pin engaging the sliding block $f$, which slides laterally in a slot in cross-head $g$, which latter slides vertically between guides $h\ h$, and, by the devices shown and described, has imparted to it a reciprocating movement equal to the stroke of the crank upon shaft $e$. $i\ i$ are the halves of the divided mold, which are, respectively, socketed in blocks $j\ j$, these latter being constructed with a dovetailed groove fitting to a corresponding feather upon the lower end of cross-head $g$, as shown in Fig. 2. These halves of the mold are pivoted to and suspended by springs $k\ k$, secured to the cross-head, as shown. By thus suspending and connecting the halves of the mold, each part has an independent lateral adjustment when the internal pressure is greater than the resistance of springs $k\ k$. $l\ l$ are springs secured to the cross-head and connected with the halves of the mold by short rods $m\ m$, and serve to open the mold when it rises. $n$ is the "form," which is seated upon bed $o$, beneath which is placed the elastic packing or cushion $p$, which allows a downward yielding movement to prevent undue pressure upon the form. $r$ is the internal elastic mold, and $s$ is the stiffening placed between the mold and the form. The lower ends of mold $r$ are pivoted to links $t$, which latter are pivoted to rod $u$, and this is stepped in the front end of the centrally-pivoted lever $v$, as shown in Fig. 2, a spring, $y$, connected with the rear end of this lever tending to draw the mold downward. $w$ is a treadle, the rear end of which is pivoted in stud $x$, and is connected with the lever by the links $z$, so that the downward pressure of the foot upon the front end of the treadle serves to force up rod $u$, and thereby raise mold $r$ from off the stiffening. $a'\ a'$ are cams, pivoted, at $b'$, in bed $o$. $c'\ c'$ are adjustable faces of the cams, which, by actuating screws $d'\ d'$, are raised or lowered for the purpose of producing a greater or less degree of inward pressure or motion upon the halves of mold $i$, which, as it descends, acts upon the lower horns of these cams, thereby forcing inward the upper ends, which, in turn, force the divided mold against the mold $r$. Small spiral springs, shown in Fig. 3, are inserted in bed $o$ beneath the cams, inside their pivots, to throw them apart when the mold rises. $e'$ is a guard or keeper, against which the front flanges of mold $i$ bear as it descends, thereby preventing the mold from being forced outward. The elastic packing $g'$, placed behind the form, allows a yielding movement when the thickness of the stiffening demands it.

The practical working of this machine, briefly stated, is as follows: The mold $i$ being raised to the position shown in Fig. 1, the operator, by actuating the treadle, raises the interior mold $r$ from the form, when the stiffening is bent to the curvature of the form and inserted between it and mold $r$, when the treadle is released, and the action of spring $y$ forces mold $r$ down upon the stiffening. The machine is then set in motion, the mold $i$ descends, coming in contact with cams $a'$, and closing in upon the interior mold $r$, as shown in Fig. 3, thereby forcing the stiffening into the exact shape of the mold and form, the flange of the stiffening, which is inserted between the soles of the shoe, being pressed between the front of the form and the vertical front flanges of mold $i$, the pressure between which is assured by guard $e'$ and elastic packing $g'$, as before described.

I claim as my invention—

1. The combination of the divided mold $i\ i$ and form $n$, substantially as described and shown.
2. In combination with mold $i$ and form $n$, the interior mold $r$, substantially as described and shown.
3. The sliding blocks $j$ and springs $k$, or their equivalents, substantially as and for the purposes specified.
4. In combination with mold $i\ i$, the cams $a'\ a'$, substantially as described and shown.
5. The guard or keeper $e'$, in combination with mold $i$ and form $n$, substantially as described and shown.

NATHAN J. SIMONDS.
E. RUSSELL EMERY.

Witnesses:
EBEN HUTCHINSON,
T. W. PORTER.